United States Patent
Lee et al.

(10) Patent No.: US 10,779,260 B2
(45) Date of Patent: Sep. 15, 2020

(54) METHOD AND APPARATUS FOR PAGING WITH RESUME ID FOR SUSPENDED USER EQUIPMENT IN WIRELESS COMMUNICATION SYSTEM

(71) Applicant: LG ELECTRONICS INC., Seoul (KR)

(72) Inventors: Youngdae Lee, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/071,732

(22) PCT Filed: Feb. 1, 2017

(86) PCT No.: PCT/KR2017/001080
§ 371 (c)(1),
(2) Date: Jul. 20, 2018

(87) PCT Pub. No.: WO2017/135676
PCT Pub. Date: Aug. 10, 2017

(65) Prior Publication Data
US 2019/0045482 A1 Feb. 7, 2019

Related U.S. Application Data

(60) Provisional application No. 62/289,920, filed on Feb. 2, 2016.

(51) Int. Cl.
*H04W 68/02* (2009.01)
*H04W 76/28* (2018.01)
*H04W 76/11* (2018.01)
*H04W 76/27* (2018.01)
*H04W 8/08* (2009.01)
*H04W 80/02* (2009.01)

(52) U.S. Cl.
CPC ............. *H04W 68/02* (2013.01); *H04W 8/08* (2013.01); *H04W 76/11* (2018.02); *H04W 76/27* (2018.02); *H04W 76/28* (2018.02); *H04W 80/02* (2013.01)

(58) Field of Classification Search
None
See application file for complete search history.

(56) References Cited

U.S. PATENT DOCUMENTS

| 2013/0039287 A1* | 2/2013 | Rayavarapu | ........ H04W 68/005 370/329 |
| 2013/0039339 A1* | 2/2013 | Rayavarapu | .......... H04W 76/19 370/331 |

(Continued)

FOREIGN PATENT DOCUMENTS

| EP | 2779528 A1 | 9/2014 | |
| KR | 10-2014-0019326 A | 2/2014 | |
| WO | WO-2017085621 A1 * | 5/2017 | ............ H04W 76/27 |

*Primary Examiner* — Kodzovi Acolatse
(74) *Attorney, Agent, or Firm* — Birch, Stewart, Kolasch & Birch, LLP

(57) ABSTRACT

An eNodeB (eNB) receives a first paging message including a first user equipment (UE) identity (ID) from a mobility management entity (MME). The eNB checks whether a UE context mapped to the first UE ID is present or not. If it is checked that the UE context mapped to the first UE ID is present, the eNB transmits a second paging message including a second UE ID, which replaces the first UE ID, to a UE.

4 Claims, 10 Drawing Sheets

(56) References Cited

U.S. PATENT DOCUMENTS

| | | | |
|---|---|---|---|
| 2013/0122922 A1* | 5/2013 | Cho | H04W 8/08 |
| | | | 455/450 |
| 2013/0260740 A1* | 10/2013 | Rayavarapu | H04W 76/27 |
| | | | 455/422.1 |
| 2013/0260810 A1* | 10/2013 | Rayavarapu | H04W 76/19 |
| | | | 455/509 |
| 2013/0260811 A1* | 10/2013 | Rayavarapu | H04W 76/19 |
| | | | 455/509 |
| 2013/0267261 A1 | 10/2013 | Nikkelen | |
| 2014/0321371 A1* | 10/2014 | Anderson | H04W 76/38 |
| | | | 370/329 |
| 2015/0043455 A1* | 2/2015 | Miklos | H04W 8/26 |
| | | | 370/329 |
| 2016/0014576 A1 | 1/2016 | Yu | |
| 2016/0142998 A1* | 5/2016 | Tsai | H04B 1/3816 |
| | | | 455/458 |
| 2016/0278160 A1* | 9/2016 | Schliwa-Bertling | H04W 48/02 |
| 2017/0202003 A1* | 7/2017 | Johansson | H04W 4/70 |
| 2018/0007590 A1* | 1/2018 | Karout | H04W 74/0833 |
| 2018/0302944 A1* | 10/2018 | Chang | H04W 76/19 |
| 2019/0020617 A1* | 1/2019 | Truchan | H04W 88/10 |
| 2019/0059119 A1* | 2/2019 | Hapsari | H04W 76/10 |

\* cited by examiner

[Fig. 1]
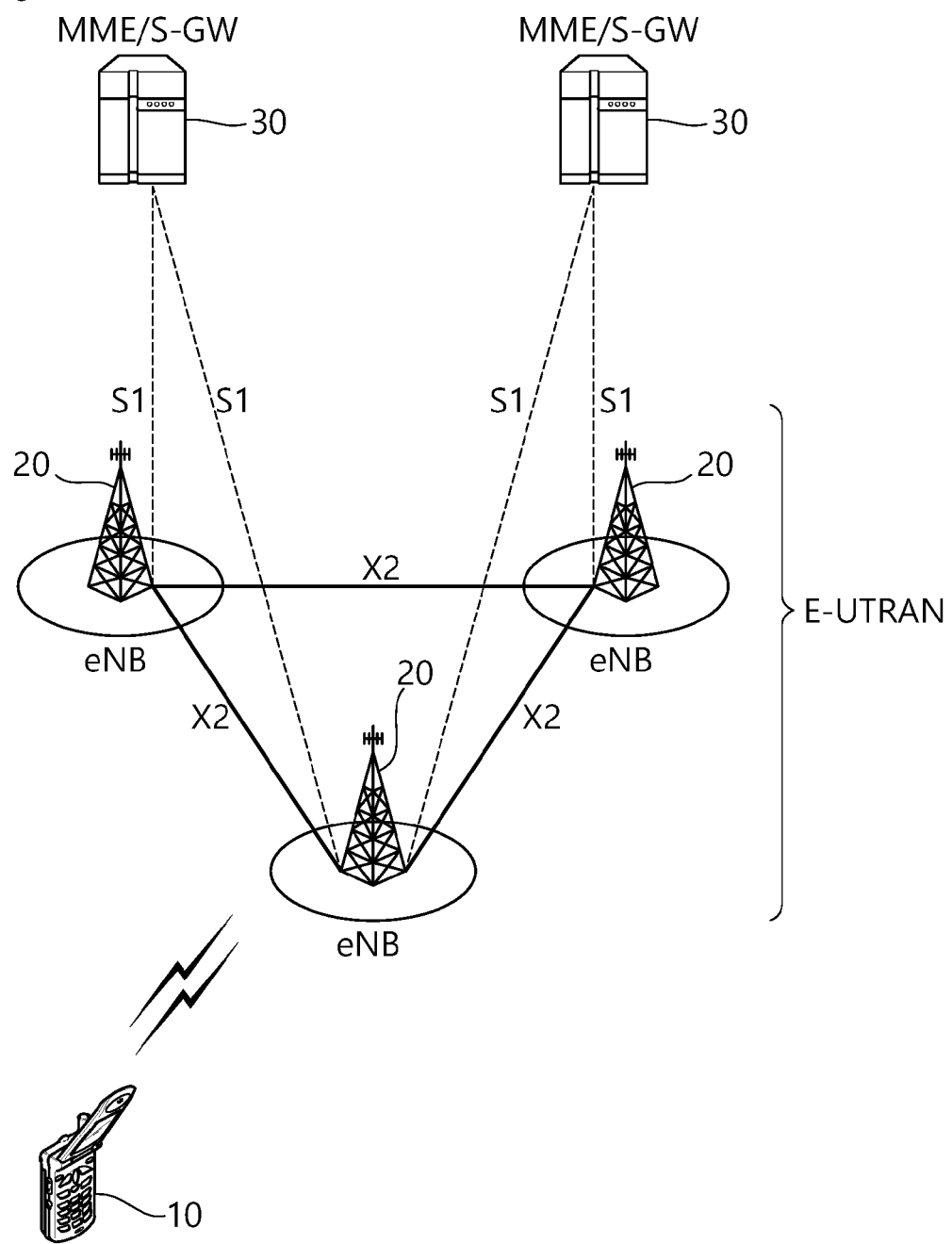

[Fig. 2]
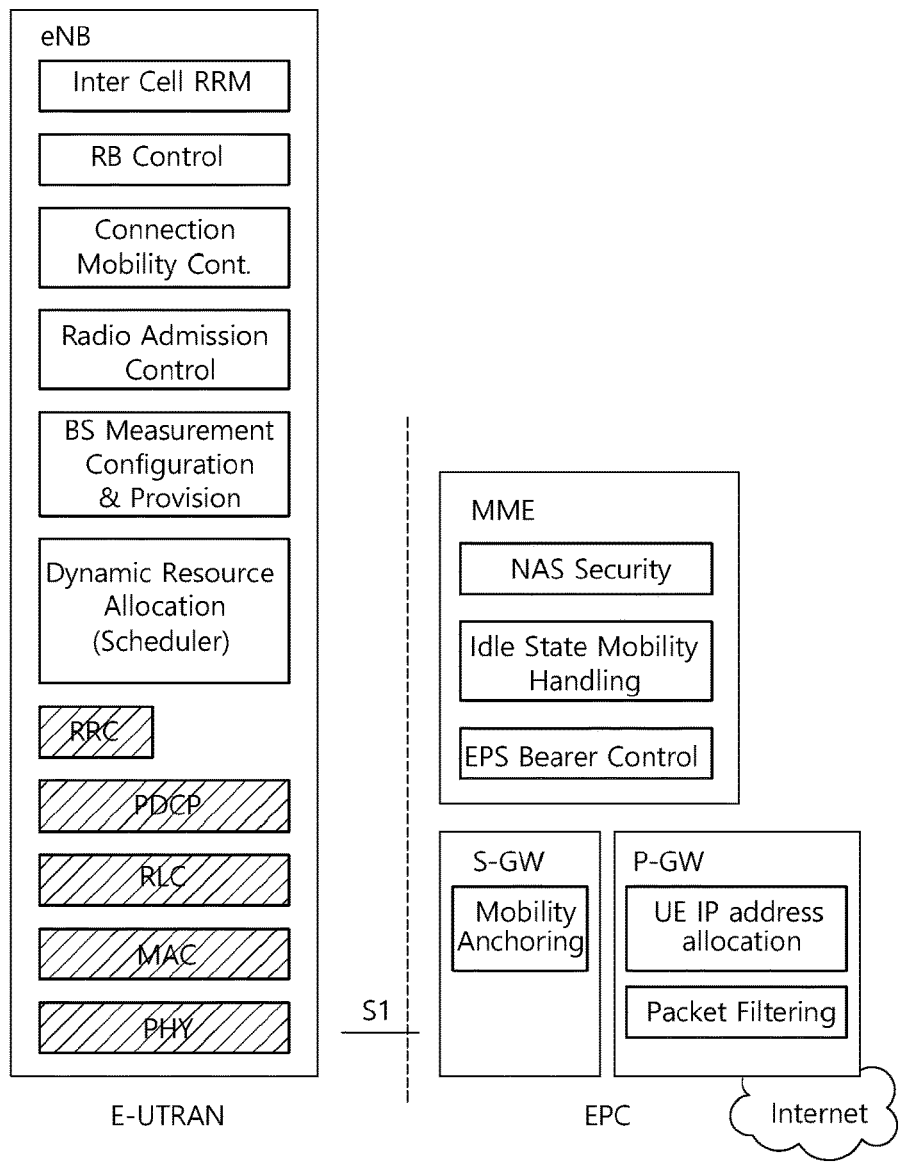
[Fig. 3]
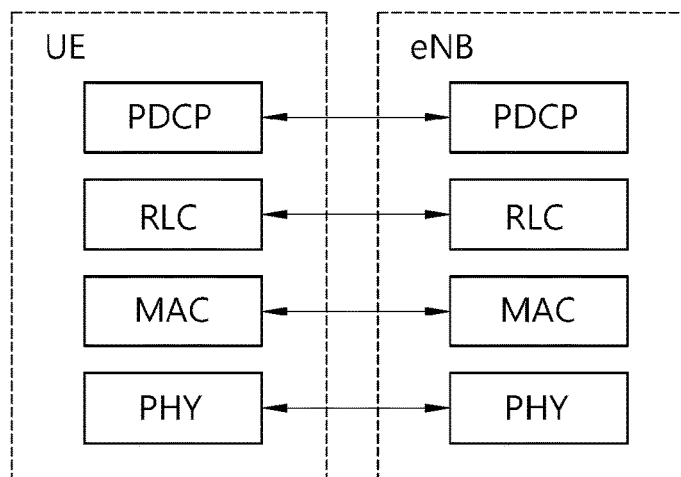

[Fig. 4]
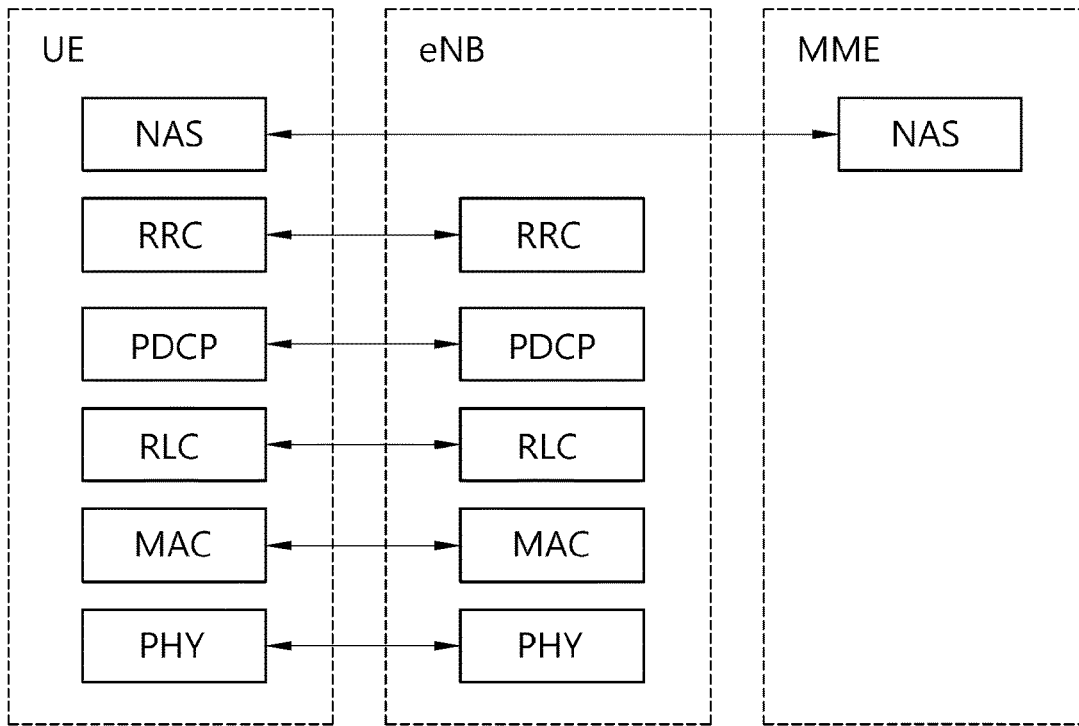
[Fig. 5]
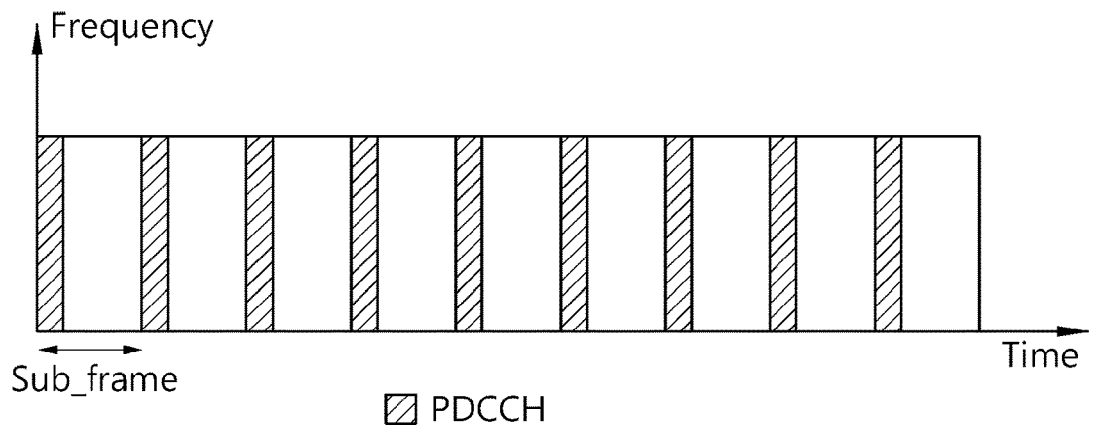
[Fig. 6]
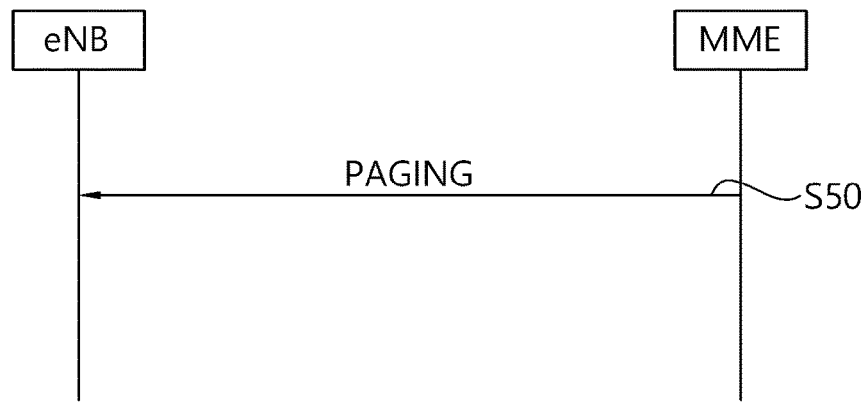

[Fig. 7]
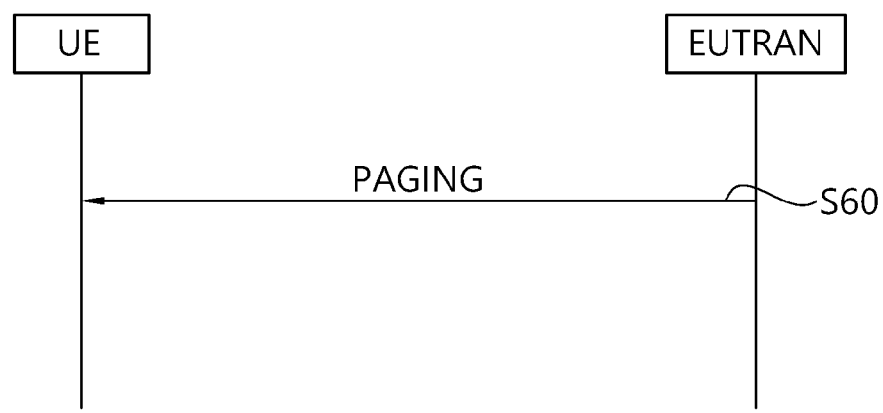

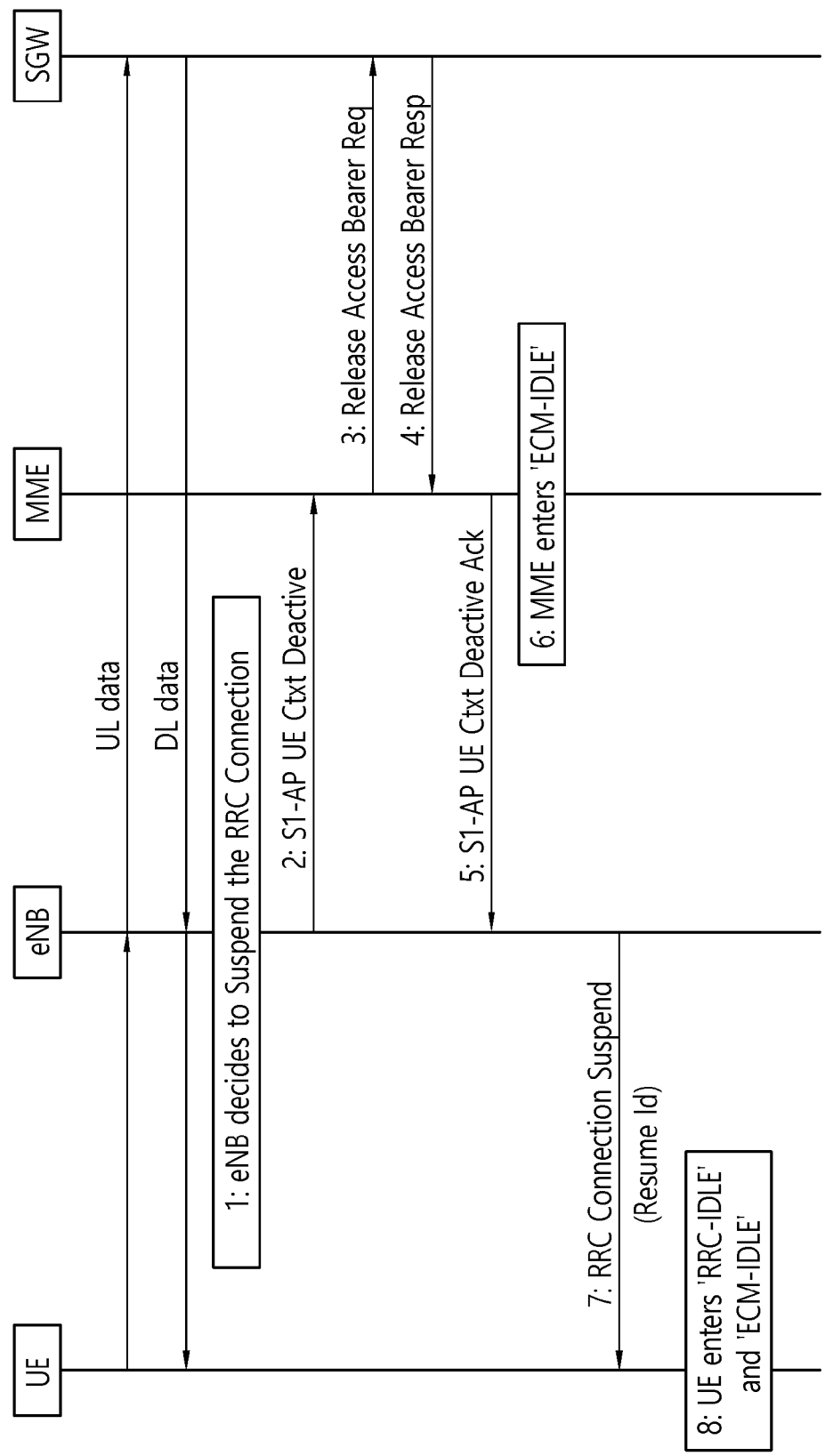
[Fig. 8]

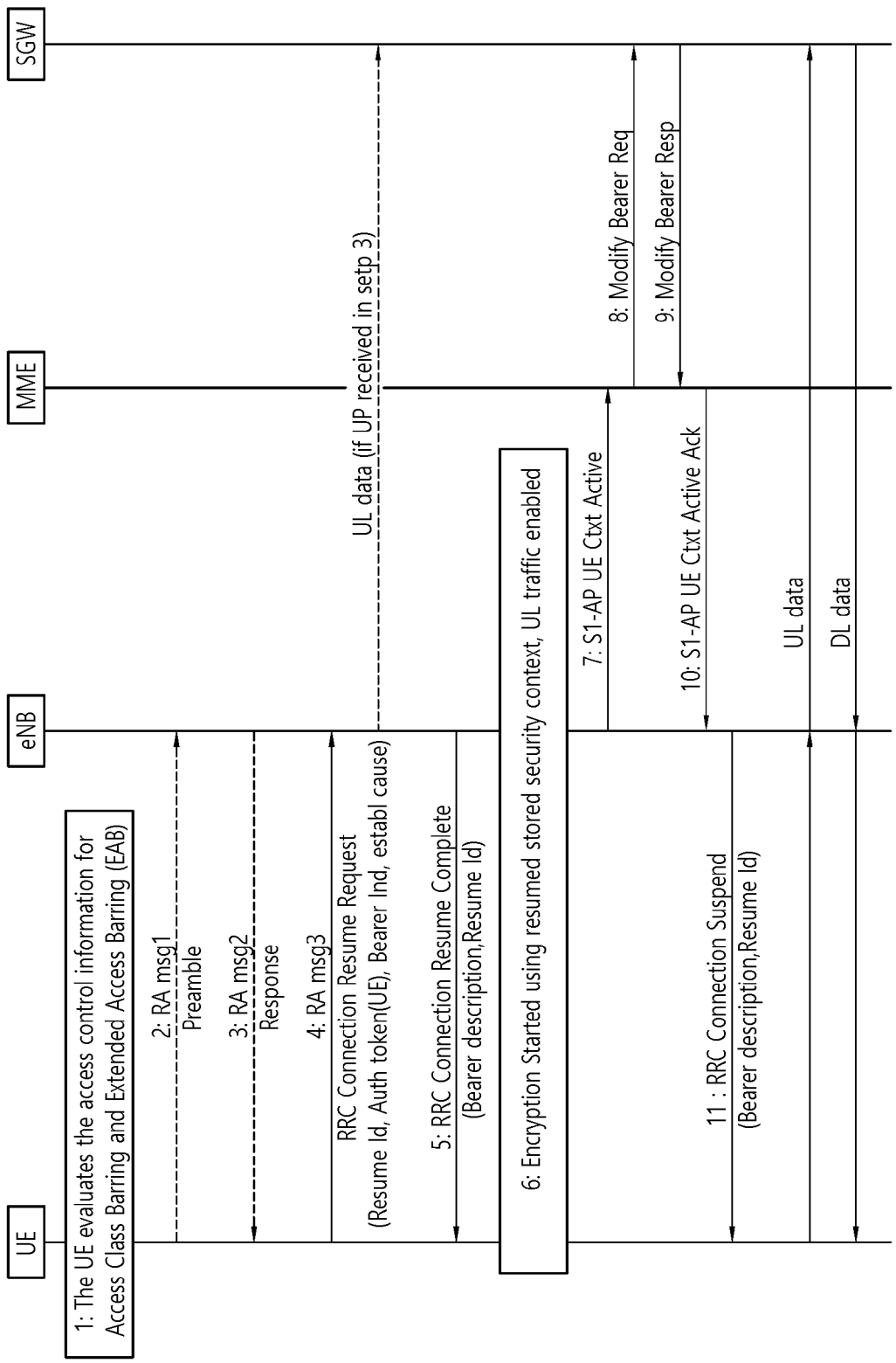
[Fig. 9]

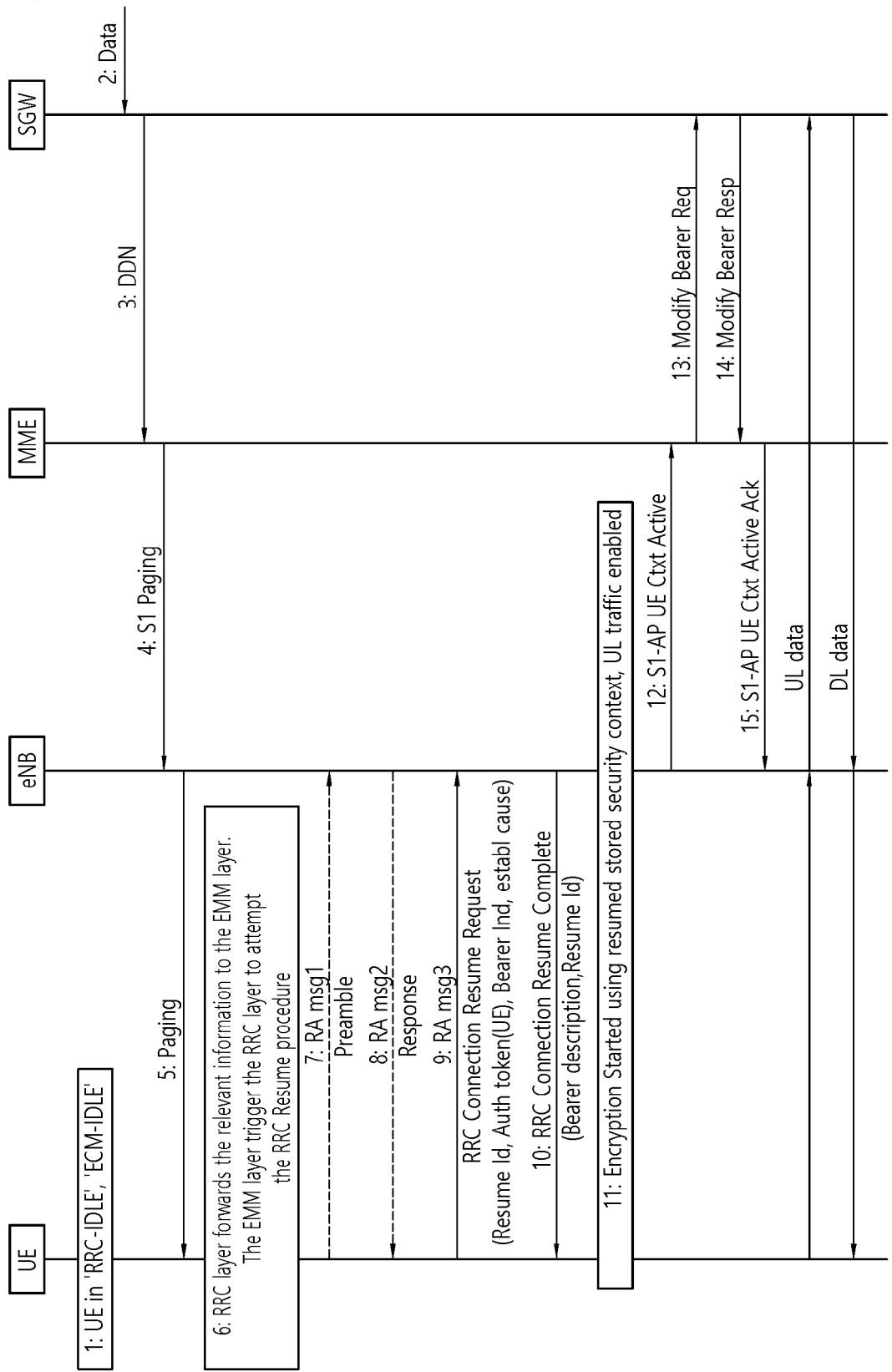
[Fig. 10]

[Fig. 11]
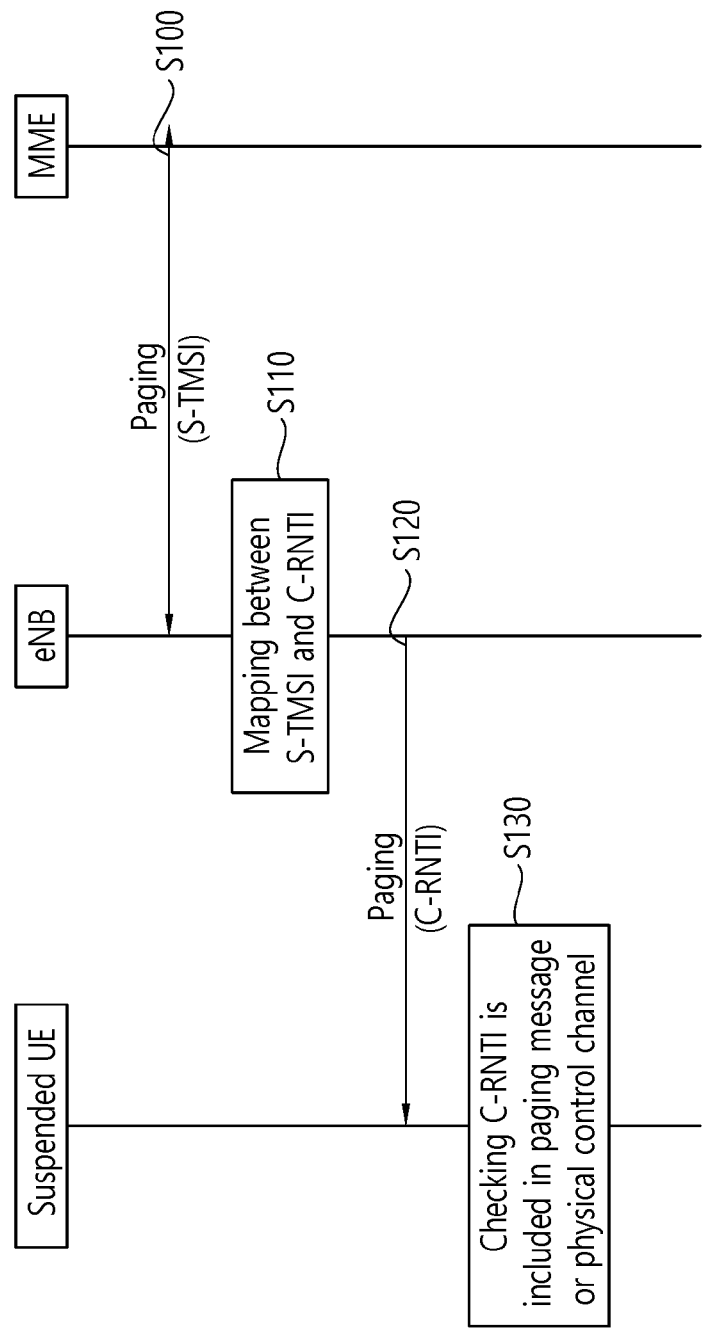

[Fig. 12]
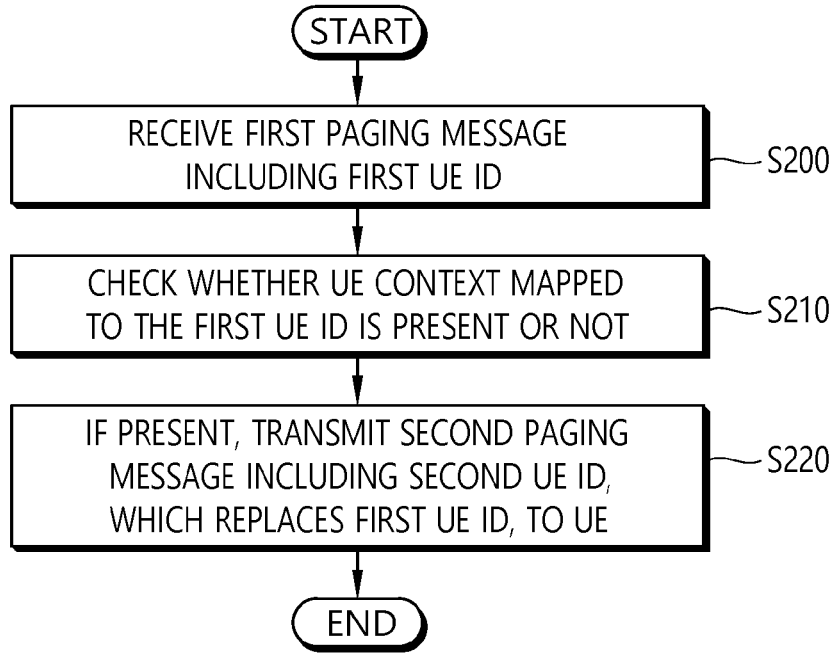
[Fig. 13]
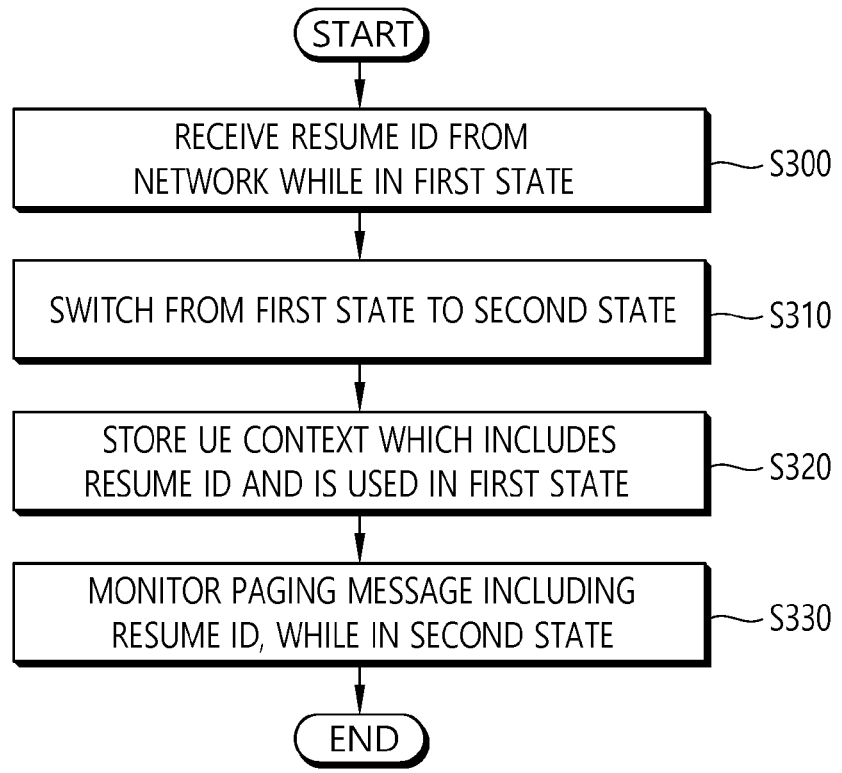

[Fig. 14]
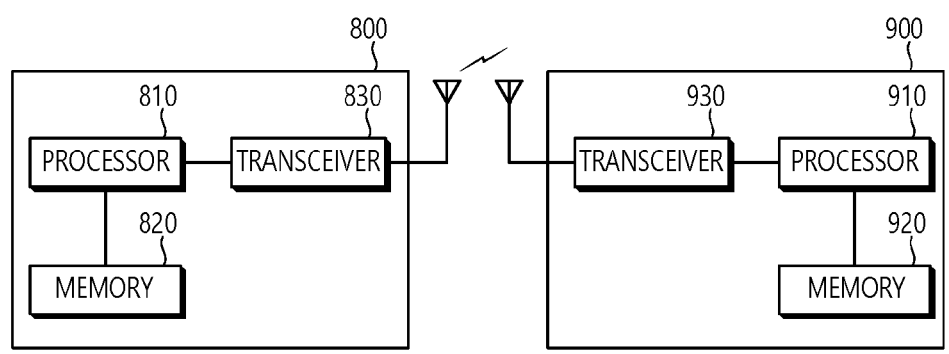

METHOD AND APPARATUS FOR PAGING WITH RESUME ID FOR SUSPENDED USER EQUIPMENT IN WIRELESS COMMUNICATION SYSTEM

CROSS REFERENCE TO RELATED APPLICATIONS

This application is the National Phase of PCT International Application No. PCT/KR2017/001080, filed on Feb. 1, 2017, which claims priority under 35 U.S.C. 119(e) to U.S. Provisional Application No. 62/289,920, filed on Feb. 2, 2016, all of which are hereby expressly incorporated by reference into the present application.

TECHNICAL FIELD

The present invention relates to wireless communications, and more particularly, to a method and apparatus for paging with a resume identifier (ID) for a suspended user equipment (UE) in a wireless communication system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Machine-to-machine (M2M) communication represents a significant growth opportunity for the 3GPP ecosystem. To support the so called "Internet-of-things" (IoT), 3GPP operators have to address usage scenarios with devices that are power efficient (with battery life of several years), can be reached in challenging coverage conditions, e.g. indoor and basements and, more importantly, are cheap enough so that they can be deployed on a mass scale and even be disposable.

Cellular IoT (CIoT) devices may require very low throughput, may not have stringent delay requirements like those required for real time services, may not need to support circuit switched services, may not need to support inter-radio access technology (RAT) mobility and may perform intra-RAT mobility by cell reselection. For CIoT, some additional features may be required.

DISCLOSURE OF INVENTION

Technical Problem

The present provides a method and apparatus for paging with a resume identifier (ID) for a suspended user equipment (UE) in a wireless communication system.

Solution to Problem

In an aspect, a method for paging a user equipment (UE) by an eNodeB (eNB) in a wireless communication system is provided. The method includes receiving a first paging message including a first UE identity (ID) from a mobility management entity (MME), checking whether a UE context mapped to the first UE ID is present or not, and if it is checked that the UE context mapped to the first UE ID is present, transmitting a second paging message including a second UE ID, which replaces the first UE ID, to the UE.

In another aspect, a method for monitoring a paging message by a user equipment (UE) in a wireless communication system is provided. The method includes receiving a resume ID from a network while in a first state, switching from the first state to a second state, storing a UE context which includes the resume ID and is used in the first state, and monitoring the paging message including the resume ID, while in the second state.

Advantageous Effects of Invention

Suspended UE can be paged by a resume ID.

BRIEF DESCRIPTION OF DRAWINGS

FIG. 1 shows LTE system architecture.
FIG. 2 shows a block diagram of architecture of a typical E-UTRAN and a typical EPC.
FIG. 3 shows a block diagram of a user plane protocol stack of an LTE system.
FIG. 4 shows a block diagram of a control plane protocol stack of an LTE system.
FIG. 5 shows an example of a physical channel structure.
FIG. 6 shows a paging procedure between MME and eNB.
FIG. 7 shows a paging procedure between eNB and UE.
FIG. 8 shows an example of suspension of a RRC connection.
FIG. 9 shows an example of resumption of a previously suspended RRC connection.
FIG. 10 shows an example of resumption of a previously suspended RRC connection for a mobile terminating (MT) case.
FIG. 11 shows a method for paging a UE according to an embodiment of the present invention.
FIG. 12 shows a method for paging a UE by an eNB according to another embodiment of the present invention.
FIG. 13 shows a method for monitoring a paging message by a UE according to an embodiment of the present invention.
FIG. 14 shows a wireless communication system to implement an embodiment of the present invention.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as Wi-Fi, WiMAX, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink LTE-advance (LTE-A) is an evolution of the 3GPP LTE.

For clarity, the following description will focus on the LTE-A. However, technical features of the present invention are not limited thereto.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a serving gateway (S-GW). The MME/S-GW 30 may be positioned at the end of the network. For clarity, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, system architecture evolution (SAE) bearer control, and ciphering and integrity protection of NAS signaling.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARM). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

FIG. 6 shows a paging procedure between MME and eNB. The purpose of the paging procedure is to enable the MME to page a UE in the specific eNB. The paging function supports the sending of paging requests to all cells of the TA(s) the UE is registered. Paging requests are sent to the relevant eNBs according to the mobility information kept in the UE's MM context in the serving MME.

Referring to FIG. 6, the MME initiates the paging procedure by sending the PAGING message to the eNB with cells belonging to the TA(s) in which the UE is registered. Each eNB can contain cells belonging to different TAs, whereas each cell can only belong to one TA. At the reception of the PAGING message, the eNB shall perform paging of the UE in cells which belong to TAs as indicated in the List of TAIs IE. The paging response back to the MME is initiated on NAS layer and is sent by the eNB based on NAS-level routing information.

Table 1 shows an example of the PAGING message. This message is sent by the MME and is used to page a UE in one or several TAs.

According to Table 2, the UE Paging Identity IE may include SAE temporary mobile subscriber identity (S-TMSI) for the UE Paging Identity.

FIG. 7 shows a paging procedure between eNB and UE. The purpose of this procedure is to transmit paging information to a UE in RRC_IDLE and/or, to inform UEs in RRC_IDLE and UEs in RRC_CONNECTED about a system information change and/or, to inform about an ETWS primary notification and/or ETWS secondary notification and/or, to inform about a CMAS notification and/or, to inform UEs in RRC_IDLE about an extended access barring (EAB) parameters modification. The paging information is provided to upper layers, which in response may initiate RRC connection establishment, e.g. to receive an incoming call.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| UE Identity Index value | M | | 9.2.3.10 | | YES | ignore |
| UE Paging Identity | M | | 9.2.3.13 | | YES | ignore |
| Paging DRX | O | | 9.2.1.16 | | YES | ignore |
| CN Domain | M | | 9.2.3.22 | | YES | ignore |
| List of TAIs | | 1 | | | YES | ignore |
| >TAI List Item | | 1 . . . <maxnoofTAIs> | | | EACH | ignore |
| >>TAI | M | | 9.2.3.16 | | — | |
| CSG Id List | | 0 . . . 1 | | | GLOBAL | ignore |
| >CSG Id | | 1 . . . <maxnoofCSGId> | 9.2.1.62 | | — | |
| Paging Priority | O | | 9.2.1.78 | | YES | ignore |
| UE Radio Capability for Paging | O | | 9.2.1.98 | | YES | ignore |

According to Table 1, the PAGING message includes "UE Paging Identity" IE. Table 2 shows the UE Paging Identity IE. This IE represents the identity with which the UE is paged.

TABLE 2

| IE/Group Name | Presence | Range | IE type and reference | Semantics description |
|---|---|---|---|---|
| CHOICE UE Paging Identity | M | | | |
| >S-TMSI | | | | |
| >>S-TMSI | M | | 9.2.3.6 | |
| >IMSI | | | | |
| >>IMSI | M | | 9.2.3.11 | |

Referring to FIG. 7, E-UTRAN initiates the paging procedure by transmitting the Paging message at the UE's paging occasion. E-UTRAN may address multiple UEs within a Paging message by including one PagingRecord for each UE. E-UTRAN may also indicate a change of system information, and/or provide an ETWS notification or a CMAS notification in the Paging message.

Table 3 shows an example of the Paging message. The Paging message is used for the notification of one or more UEs.

TABLE 3

```
-- ASN1START
Paging ::= SEQUENCE {
    pagingRecordList     PagingRecordList                        OPTIONAL, -- Need ON
    systemInfoModification           ENUMERATED {true}           OPTIONAL, -- Need ON
    etws-Indication                  ENUMERATED {true}           OPTIONAL, -- Need ON
    nonCriticalExtension             Paging-v890-IEs             OPTIONAL
}
Paging-v890-IEs ::= SEQUENCE {
    lateNonCriticalExtension         OCTET STRING                OPTIONAL,
    nonCriticalExtension             Paging-v920-IEs             OPTIONAL
}
Paging-v920-IEs ::= SEQUENCE {
    cmas-Indication-r9               ENUMERATED {true}           OPTIONAL, -- Need ON
    nonCriticalExtension             Paging-v1130-IEs            OPTIONAL
}
```

TABLE 3-continued

```
Paging-v1130-IEs ::= SEQUENCE {
    eab-ParamModification-r11        ENUMERATED {true}    OPTIONAL, -- Need ON
    nonCriticalExtension             SEQUENCE { }         OPTIONAL
}
PagingRecordList ::= SEQUENCE (SIZE (1..maxPageRec)) OF PagingRecord
PagingRecord :: = SEQUENCE {
    ue-Identity     PagingUE-Identity,
    cn-Domain       ENUMERATED          {ps, cs},
    ...
}
PagingUE-Identity ::= CHOICE {
    s-TMSI   S-TMSI,
    imsi     IMSI,
    ...
}
IMSI ::= SEQUENCE (SIZE (6..21)) OF IMSI-Digit
IMSI-Digit ::= INTEGER (0..9)
-- ASN1STOP
```

According to Table 3, the Paging message also includes PagingUE-Identity field, like the PAGING message shown in Table 1. The PagingUE-Identity field may include S-TMSI.

Cellular internet-of-things (CIoT) is Internet-of-Things using 3GPP technology. Performance objectives of CIoT may include improved indoor coverage, support of massive number of low throughput devices, reduced complexity, improved power efficiency, and latency. The user plane data rate requirements of CIoT on the core network are very low compared to that of an LTE core network. Control plane efficiency is important for the CIoT system. Even with low data rate due to large number of devices will result in high number of establishing and releasing an RRC connection. Applications expected to be supported on CIoT are generally expected to be delay tolerant. For certain application requiring strict delay profile, max delay of 10 sec is considered. Support for Inter-RAT mobility and Intra-RAT network controlled handover are not required. Support for circuit-switched (CS) services is not required.

For one aspect of CIoT, narrowband IoT (NB-IoT) may be supported. NB-IoT allows access to network services via E-UTRA with a channel bandwidth limited to 180 kHz. For the purpose of supporting ultra-low cost devices, NB-IoT may support a reduced subset of functions compared with E-UTRAN system. The following functions may be supported by NB-IoT:

Network sharing (up to 6 PLMNs);
Access control (per PLMN);
Cell barring and cell reservation;
Differentiation in access of exceptional reporting and normal reporting;
Intra-frequency and inter-frequency cell reselection;
Power saving mode;
Idle mode DRX with DRX cycle values in the "normal" range and in eDRX range.

The following functions may not be supported by NB-IoT:

Inter-RAT cell reselection or inter-RAT mobility in connected mode
Public warning functions like CMAS, ETWS and PWS;
Handover and measurement reporting;
Guaranteed bit rate (GBR) (i.e. quality of service (QoS));
Closed subscription group (CSG);
Relaying;
Dual connectivity;
Multimedia Broadcast Multicast Services (MBMS);
Real time services;
In-device coexistence;
RAN assisted wireless local area network (WLAN) interworking;
Proximity-based services (ProSe; including direct communication and direct discovery);
Minimization of drive tests (MDT);
Limited service state and emergency call are not supported;
CS services and CS fallback;
Service Specific Access Control (SSAC) and access class barring (ACB)-skip.

In order to support CIoT and/or NB-IoT efficiently, signaling overhead problem should be addressed. The main contributors to the signaling overhead may be procedures used in current S1-based evolved packet system (EPS) architecture required for UE state transition, i.e. at transition between idle and connected state. There is a significant signaling overhead on the radio/Uu, S1AP interface, due to current S1/EPS architecture based procedures required to establish and tear down a connection in order for the UE to be able to transfer/receive user plane (i.e. procedures applicable at UE idle/connected state transition). In order to reduce the signaling overhead and the associated processing load in the network required by the procedures, user plane based solution with AS information stored in RAN may be proposed. That is, re-use of information from the previous RRC connection for the subsequent RRC connection setup may be proposed.

This functionality may be supported on an eNB basis, i.e. the resumption of the previously suspended connection may be limited to the cells configured on the eNB where that connection was previously suspended. However, this solution may also be introduced and supported for UEs having transactions over multiple eNBs by introducing it over a cluster of eNBs that support UE context transfer between the eNBs via the X2 interface.

The signaling overhead reduction may be realized by introducing two new procedures 'RRC Suspend' and 'RRC Resume' and the introduction of a modified UE behavior in new CIoT idle state, where relevant AS information is always stored at transition to idle state, triggered by a RRC suspend procedure, and re-used for a subsequent connection setup by a new type of UE. In the context of this solution, the UE may store the relevant AS information at transition into EPS connection management (ECM) idle state (ECM-IDLE) triggered by a RRC suspend procedure. Throughout this solution, the RRC_IDLE state refers to the new CIoT RRC_IDLE state.

The RRC suspend procedure is used at transition from RRC_CONNECTED to RRC_IDLE and causes the UE to retain the context in RRC_IDLE. The eNB and the UE may store RRC connection related information, e.g. AS security context, bearer related information (including robust header compression (RoHC) state information) and L1/L2 parameters when applicable. The eNB may provide the UE with an identifier, referred as 'Resume ID', e.g. based on the eNB ID, used to address the relevant information stored in the eNB. Relevant network nodes may store S1-MME UE association and S1-U bearer context related information. This basically means that the S1AP UE contexts are stored and kept in the eNB and the MME. Additionally, the eNB may store and keep the S1-U tunnel addresses. The latter reduces the processing load on the eNB required for establishment of S1-U bearers. UE's mobility behavior may be the same as in current RRC_IDLE, e.g. the UE may apply normal or extended idle mode DRX parameters, perform cell re-selection etc. At transition to RRC_IDLE, the EPS mobility management (EMM) layer enters ECM-IDLE.

FIG. 8 shows an example of suspension of a RRC connection.

1. The eNB decides to suspend the RRC connection.
2. The eNB transmits a S1-AP UE Context Deactive message (new S1-AP message) to the MME which indicates that the UE's RRC connection is suspended. The MME and eNB store the S1AP association and the related UE contexts. The MME enters ECM-IDLE. The MME stores the DL tunneling endpoint IDs (TEIDs) associated with the UE and eNB.
3. The MME sends a Release Access Bearers Request (abnormal release of radio link indication or 'new cause') message to the S-GW that requests the release of all S1-U bearers for the UE. The S-GW considers UE being in idle state.
4. The S-GW transmits a Release Access Bearer Response message to the MME as a response to the Release Access Bearers Request message in step 3.
5. The MME transmits a S1-AP UE Context Deactive Acknowledge message to the eNB as a response to the S1-AP UE Context Deactive message in step 2.
6. The MME enters ECM-IDLE.
7. The eNB transmits a RRC Connection Suspend message to the UE to suspend the RRC connection towards the UE. An identifier that is used at subsequent resumption of that suspended RRC connection (i.e. Resume ID) may be provided. The UE and the eNB may store the related context information, i.e. RRC configuration, bearer configuration (including RoHC state information), AS security context and L1/L2 parameters when applicable. The RRC Connection Suspend message may also contain the security algorithm configuration and the next hop chaining counter (NCC) associated with the K_eNB that is to be used at subsequent resumption.
8. The RRC layer of the UE enters RRC_IDLE where it store the relevant AS information. The NAS layer of the UE layer enters ECM-IDLE where it is aware that a NAS signaling connection is available.

The RRC resume procedure is used at transition from RRC_IDLE to RRC_CONNECTED, and in the RRC resume procedure, previously stored information in the UE as well as in the eNB is utilized to resume the RRC connection. The UE may provide the previously received Resume ID to be used by the eNB to access the stored information required to resume the RRC connection. Furthermore the UE may provide an authentication token used to securely identify the UE. Relevant network nodes may re-store/re-use S1-MME UE S1AP association and S1-U bearer context related information.

FIG. 9 shows an example of resumption of a previously suspended RRC connection.

1. The UE evaluates the access control information for ACB and EAB.
2. The UE transmits a RA Msg 1, i.e. random access preamble, to the enB.
3. The eNB transmits a RA Msg 2, i.e. random access response, to the UE as a response to the RA Msg 1.
4. The UE transmits a RA Msg 3, i.e. new RRC Connection Resume Request message, to the eNB. The RRC Connection Resume Request message may include Resume ID, authentication token, bearer indication, and/or establishment cause. The eNB may use the Resume ID to associate the UE with the previously stored UE context. Additionally, Msg3 may also contain user plane multiplexed by MAC where resumed stored security context may be used to encrypt the user plane.
5. The eNB transmits a RA Msg 4, i.e. new RRC Connection Resume Complete message to the UE. The eNB may indicate which dedicated RBs (DRBs) are resumed in the RRC Connection Resume Complete message. Furthermore, the RRC Connection Resume Complete message may include the Resume ID and if applicable updated L1/L2 parameters.
6. The UE and eNB resume the stored security context. Encryption is started by using resumed stored security context.
7. The eNB transmits a new S1AP message, i.e. S1-AP UE Context Active message, to the MME to notify of UE state change. The MME enters the ECM-CONNECTED. MME may identify that the UE returns at the eNB for which MME has stored information about allocated DL TEIDs for the UE.
8. The MME sends a Modify Bearer Request message (eNB address, S1 TEID(s) (DL) for the accepted EPS bearers, delay DL packet notification request, RAT type) per PDN connection to the S-GW. If the S-GW supports the modify access bearers request procedure and if there is no need for the S-GW to send the signalling to the P-GW, the MME may send the Modify Access Bearers Request message (eNB address(es) and TEIDs for DL user plane for the accepted EPS bearers, delay DL packet notification request) per UE to the S-GW to optimize the signalling. The S-GW is now able to transmit DL data towards the UE. The S-GW considers UE being in connected state.
9. The S-GW transmits a Modify Bearer Response message to the MME as a response to the Modify Bearer Request message in step 8.
10. The MME transmits a S1-AP UE Context Active Acknowledge message to the eNB as a response to the S1-AP UE Context Active message in step 7.
11. Alternatively to transmission of Msg 4 in step 5, if Msg 3 includes user plane and indication that all user plane is transmitted, the eNB may transmit a RRC Connection Suspend message to the UE to suspend the RRC connection and implicitly indicate that the user plane was successfully received.

FIG. 10 shows an example of resumption of a previously suspended RRC connection for a mobile terminating (MT) case.

1. The UE is in RRC_IDLE and ECM-IDLE.
2. The S-GW receives data for a UE in RRC_IDLE.
3. The S-GW sends DL data notification (DDN) to the MME.

4. The MME sends a S1Paging message to the eNB(s). The MME may at first attempt page the UE using the existing S1AP association, i.e. S1AP association that was suspended.

5. The eNB pages the UE over the radio interface.

6. The RRC layer of the UE forwards the relevant information to the EMM layer of the UE. The EMM layer of the UE triggers the RRC layer of the UE to attempt the RRC resume procedure.

7. The UE sends a random access preamble to the eNB.

8. The eNB transmits a random access response to the UE as a response to the random access preamble.

9. The UE transmits a RA Msg 3, i.e. new RRC Connection Resume Request message, to the eNB. The RRC Connection Resume Request message may include Resume ID, authentication token, bearer indication, and/or establishment cause. The eNB may use the Resume ID to associate the UE with the previously stored UE context.

10. The eNB transmits a RA Msg 4, i.e. new RRC Connection Resume Complete message to the UE. The eNB may indicate which dedicated RBs (DRBs) are resumed in the RRC Connection Resume Complete message. Furthermore, the RRC Connection Resume Complete message may include the Resume ID and if applicable updated L1/L2 parameters.

11. The UE and eNB resume the stored security context. Encryption is started by using resumed stored security context.

12. The eNB transmits a new S1AP message, i.e. S1-AP UE Context Active message, to the MME to notify of UE state change. The S1-AP UE Context Active message may indicate paging response. The MME enters the ECM-CONNECTED. MME may identify that the UE returns at the eNB for which MME has stored information about allocated DL TEIDs for the UE.

13. The MME sends a Modify Bearer Request message (eNB address, S1 TEID(s) (DL) for the accepted EPS bearers, delay DL packet notification request, RAT type) per PDN connection to the S-GW. If the S-GW supports the modify access bearers request procedure and if there is no need for the S-GW to send the signalling to the P-GW, the MME may send the Modify Access Bearers Request message (eNB address(es) and TEIDs for DL user plane for the accepted EPS bearers, delay DL packet notification request) per UE to the S-GW to optimize the signalling. The S-GW is now able to transmit DL data towards the UE. The S-GW considers UE being in connected state.

14. The S-GW transmits a Modify Bearer Response message to the MME as a response to the Modify Bearer Request message in step 8.

15. The MME transmits a S1-AP UE Context Active Acknowledge message to the eNB as a response to the S1-AP UE Context Active message in step 7.

During the current paging procedure, as shown in FIGS. 6 and 7 (and Table 1 to 3) above, the MME and eNB may utilize the S-TMSI as an identity for the paged UE, since the MME only knows about S-TMSI and eNB does not have any UE information about UE in RRC_IDLE. However, by introduction of the RRC suspend/resume procedure as described above, the eNB may have the UE context including resume ID (e.g. cell radio network temporary identity (C-RNTI) or pair of C-RNTI and cell identity (e.g. physical cell ID (PCI)). Accordingly, the eNB may page the UE with resume ID.

Hereinafter, a method for paging a suspended UE with resume ID according to an embodiment of the present invention is proposed. In the present invention, it is assumed that the UE is in suspended state by the RRC connection suspend procedure. In other words, while the UE is in RRC_IDLE and ECM-IDLE, the UE and network (e.g. eNB, MME) have the stored UE context information.

According to an embodiment of the present invention, the eNB may transmit resume ID information in paging occasion of the UE. In the paging occasion of the UE, if there is a pending paging message, the eNB may use all or subset of resume ID for paging the UE. The resume ID may be a C-RNTI. Or, the resume ID may be a combination of the C-RNTI and cell identity (e.g. PCI, E-UTRAN cell global ID (ECGI)). Or, the resume ID may be a new ID for the paged UE. The UE may read a paging message or related physical control channel and check whether the resume ID is included in the paging message or related physical control channel.

FIG. 11 shows a method for paging a UE according to an embodiment of the present invention.

In step S100, if there is any DL data for UE in ECM-IDLE, the MME transmits a paging message including S-TMSI to the eNB with the tracking area.

In step S110, the eNB searches a stored UE context for the UE to be paged. That is, the eNB maps the S-TMSI, which is included in the paging message received from the MME, to a stored UE context for the UE to be paged. The stored UE context may include the resume ID for the UE to be paged. The resume ID may be a C-RNTI. Or, the resume ID may be a combination of the C-RNTI and cell identity (e.g. PCI, ECGI). Or, the resume ID may be a new ID for the paged UE.

In step S120, if the eNB has the stored UE context, including the resume ID, for the UE to be paged corresponding to the S-TMSI, the eNB transmits a paging message to the UE in paging occasion of the UE. In this case, the paging message may include the resume ID (e.g. C-RNTI), instead of the S-TMSI. Alternatively, the eNB may transmit the resume ID (e.g. C-RNTI) in physical control channel (e.g. PDCCH, MTC PDCCH (M-PDCCH)). Alternatively, the enB may encode the physical control channel with the resume ID (e.g. C-RNTI). If there is no stored UE context for the UE to be paged in the eNB, the eNB may page the UE with S-TMSI as in current procedure.

In step 130, the UE checks whether the resume ID is included in the paging message or physical control channel. If the resume ID is included in the paging message or physical control channel, the UE may forward the received resume ID to the upper layer of the UE, and the upper layer of the UE may trigger establishment of RRC connection. More specifically, after reading the paging message and resume ID (e.g. C-RNTI) is included in the paging message, or after monitoring the physical control channel with paging RNTI (P-RNTI) and resume ID (e.g. C-RNTI) is included in physical control channel, or after success of decoding physical control channel with resume ID (e.g. C-RNTI), the UE may forward the received resume ID to the upper layer of the UE, and the upper layer of the UE ma trigger establishment of RRC connection. When forwarding the received resume ID to the upper layer of the UE, the AS layer of the UE (i.e. RRC layer) may forward the S-TMSI stored in UE context to the upper layer of the UE, instead of received resume ID (e.g. C-RNTI).

Due to the reduced size of the resume ID compared to the legacy UE identity (i.e. S-TMSI), the paging message size may be reduced. According to the present invention, considering the large number of repetitions for paging transmission for UEs in enhanced coverage, the reduced size of paging message may result in improved battery usage of the UE, especially IoT UE.

Meanwhile, if the UE is not in suspended state, the UE may fall back to the legacy paging procedure. In other words, the UE monitors a physical control channel (e.g. PDCCH) with P-RNTI and if S-TMSI of the UE is included in paging records in the paging message, the UE forward the S-TMSI to the upper layer of the UE.

FIG. 12 shows a method for paging a UE by an eNB according to another embodiment of the present invention. The above description of the present invention may be applied to this embodiment of the present invention. In this embodiment, the UE may be in a suspended state in which the UE is in a RRC_IDLE and ECM-IDLE, but the UE and the eNB have a stored UE context.

In step S200, the eNB receives a first paging message including a first UE ID from the MME. The first UE ID may be S-TMSI of the UE.

In step S210, the eNB checks whether a UE context mapped to the first UE ID is present or not. If it is checked that the UE context mapped to the first UE ID is present, in step S220, the eNB transmits a second paging message including a second UE ID, which replaces the first UE ID, to the UE. The second UE ID may be a resume ID which is an identifier used at resumption of a suspended RRC connection. The resume ID is a combination of a C-RNTI and a cell identity. The cell identity may be one of a PCI or ECGI. The UE context may include the second UE ID.

FIG. 13 shows a method for monitoring a paging message by a UE according to an embodiment of the present invention. The above description of the present invention may be applied to this embodiment of the present invention. In this embodiment, the UE may be in a suspended state in which the UE is in a RRC_IDLE and ECM-IDLE, but the UE and the eNB have a stored UE context.

In step S300, the UE receives a resume ID from a network while in a first state. The first state may be RRC_CONNECTED.

In step S310, the UE switches from the first state to a second state. The second state is the suspended state.

In step S320, the UE stores a UE context which includes the resume ID and is used in the first state. The resume ID may be an identifier used at resumption of a suspended RRC connection. The resume ID is a combination of a C-RNTI and a cell identity. The cell identity may be one of a PCI or ECGI.

In step S330, the UE monitors the paging message including the resume ID, while in the second state. The UE may further forward the resume ID to an upper layer of the UE.

FIG. 14 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for paging a user equipment (UE) by an eNodeB (eNB) in a wireless communication system, the method comprising:
   transmitting, to the UE, a radio resource control (RRC) release message including a suspend indication;
   receiving a first paging message including a first UE identity (ID) from a mobility management entity (MME);
   checking whether a UE context mapped to the first UE ID is present or not; and
   based on that the UE context mapped to the first UE ID is present, transmitting a second paging message including a second UE ID, which replaces the first UE ID, to the UE,
   wherein the first UE ID is a system architecture evolution (SAE) temporary mobile subscriber identity (S-TMSI) of the UE and the second UE ID is a resume ID which is an identifier used at resumption of a suspended RRC connection,
   wherein the UE context includes the second UE ID, and
   wherein the second UE ID is mapped to the first UE ID in the eNB.

2. The method of claim 1, wherein the UE is in a suspended state in which the UE is in a RRC idle state and an evolved packet system (EPS) connection management (ECM) idle state but the UE and the eNB have a stored UE context.

3. The method of claim 1, wherein the resume ID is a combination of a cell radio network temporary identity (C-RNTI) and a cell identity.

4. The method of claim 3, wherein the cell identity is one of a physical cell ID (PCI) or an E-UTRAN cell global ID (ECGI).

* * * * *